No. 889,488. PATENTED JUNE 2, 1908.
S. M. SMITH.
STUMP AND TREE PULLER.
APPLICATION FILED MAR. 26, 1908.
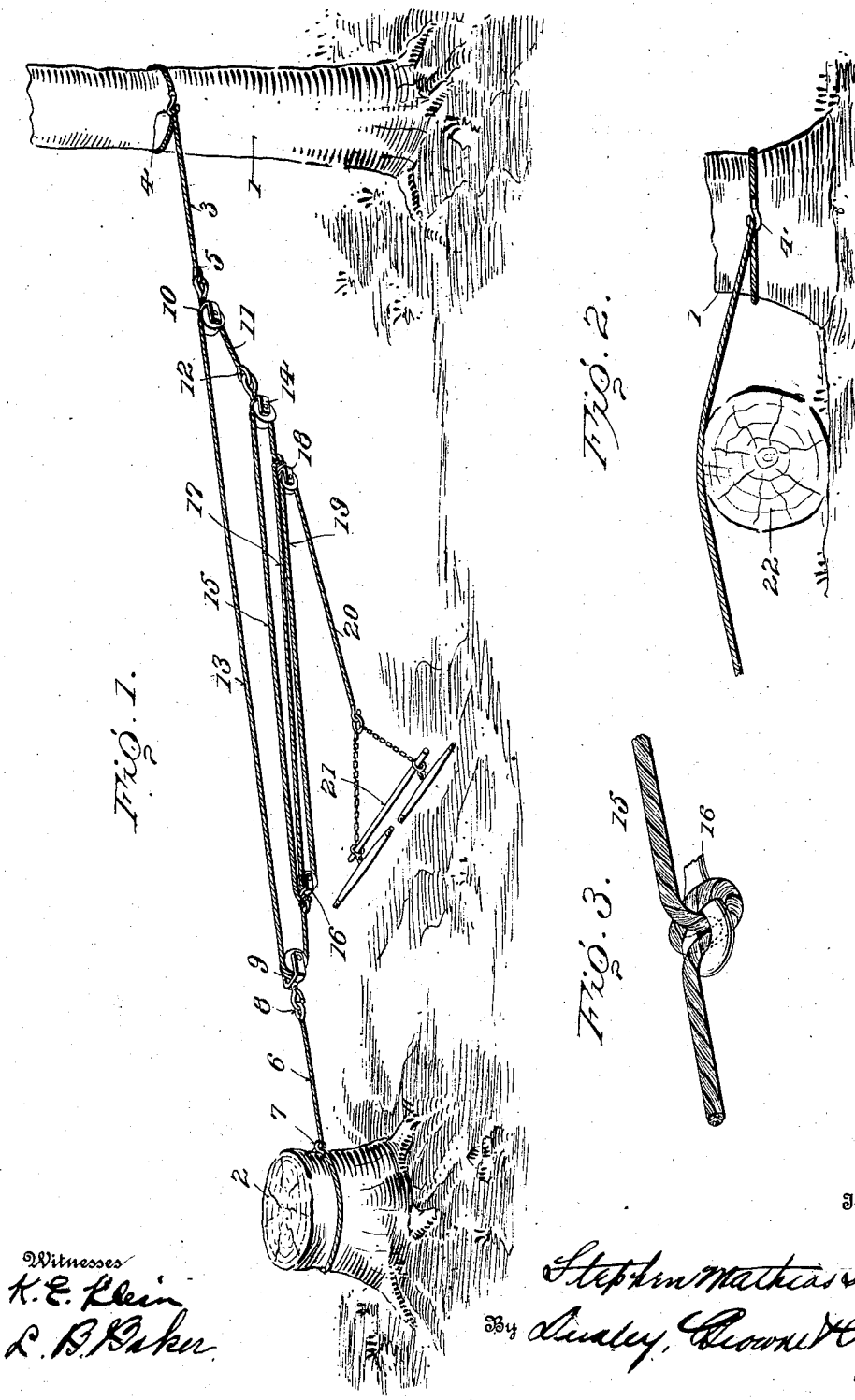
Witnesses
K. E. Klein
L. B. Baker
Inventor
Stephen Mathias Smith
By Linley, Brown & Phelps
Attorneys

UNITED STATES PATENT OFFICE.

STEPHEN MATHIAS SMITH, OF BOISE, IDAHO.

STUMP AND TREE PULLER.

No. 889,488.　　　　Specification of Letters Patent.　　　Patented June 2, 1908.

Application filed March 26, 1908. Serial No. 423,351.

*To all whom it may concern:*

Be it known that I, STEPHEN MATHIAS SMITH, citizen of the United States, residing at Boise, in the county of Ada and State of Idaho, have invented certain new and useful Improvements in Stump and Tree Pullers, of which the following is a specification.

My invention relates to an improved apparatus for the pulling of trees or stumps of trees from the ground, and it has for its object the production of an apparatus for this purpose which is simple in character but which will greatly magnify the power applied thereto and be capable of pulling out from the ground trees and stumps of large size and which are firmly rooted therein, and this without necessity of previously excavating the earth from around roots of such trees or stumps or of cutting the roots thereof.

A further object of my invention is the production of an apparatus of this character in which there is employed a minimum of parts, thereby reducing the weight of the apparatus in transporting the same from place to place and where the same is employed in a new or thickly-wooded country it is usually dragged from place to place by the team employed as the power applied thereto. The few parts employed also results in the reduction of friction in the operation of the apparatus as well as a resultant economy in the production of such parts.

With these and further objects in view my invention consists in certain constructions, combinations and arrangements of parts the preferred form of which will be first described in connection with the accompanying drawings and then the invention particularly pointed out in the appended claims.

Referring to the accompanying drawings wherein the same part is designated by the same reference numeral wherever it occurs, Figure 1 is a perspective view showing the apparatus as applied to a tree and indicating the several parts thereof in the relative position for operation to pull down the tree; Fig. 2 is a perspective view showing how the apparatus is preferably attached to a stump to extract the same; and Fig. 3 is a detail view showing the preferred form of knot used to attach certain of the blocks to the running part of the cable.

1 designates the tree or stump to be pulled down or extracted.

2 designates a tree or stump which forms the anchorage.

3 designates a line or cable provided on one end with a hook 4 and on its opposite end with an eye 5. This cable is adapted to be passed around the tree or stump to be pulled and the hook engaged over the cable as shown. The hook is secured to the cable in such relation to the anchorage that the pull comes on the side of the tree instead of directly in front, in order to give the tree a twist, in addition to the pull, thus materially assisting in loosening the same from the ground.

Around the stump or tree 2 which forms the anchorage, I pass a cable 6 provided with a hook 7 at one end, and an eye 8 at the other, which affords a ready means of attaching a standing block 9, secured to the eye 8, to the anchorage by merely passing the cable 6 around the anchorage hooking the hook 7 over the cable.

10 is a single block attached to the eye 5 of the cable 3 in any desired manner. Through the blocks 9 and 10 I reeve a cable having a fall 11 provided with an eye 12 in its end. The running portion of the cable extending between the blocks 9 and 10 I designate as 13.

14 is a block secured to the eye 12, and the cable, after passing around the sheave of the block 9, extends over the sheave of the block 14. The portion of the cable between the blocks 9 and 14 I have designated as 15. Bent on the cable 15, preferably by means of the double half hitch bend shown in detail in Fig. 3, I secure the block 16, this block being bent on the cable near the block 9. The cable after passing through the block 14 passes over the sheave of the block 16, the portion of the cable between the blocks 14 and 16 being designated 17. Bent on to the portion 17 of the cable is a block 18, the block being preferably secured by the hitch shown in Fig. 3, the portion of the cable between the blocks 16 and 18 being designated 19.

20 designates the fall of the cable to which I have shown secured the whiffletree 21, to which a pair of horses may be attached. When the apparatus is assembled as just described and power is applied to the fall 20, the power transmitted to the section 17 through the pulley 18 will be double the power on the fall. The power exerted by the pulley 14 upon the running end 11 will likewise be double the power of the section 17, and similarly the power exerted by the running block 10 will be double that transmitted by the block 14. In addition to this multiplication of power, it will be noted that there is exerted by the section 19 of the cable a pull upon the section 15, which is double the power exerted upon the fall 20 and, consequently, there is transmitted through the pulley 9 a similar amount of power which further increases the power delivered by the block 10.

While I have described my apparatus as comprising five blocks, it is to be noted that the number of blocks can be increased which will cause the power delivered to the standing block to be correspondingly multiplied. The form of apparatus disclosed in this application is, however, sufficient to enable a pair of horses to pull over trees and uproot stumps of any ordinary size.

While I have described my apparatus as being particularly adapted for pulling stumps and trees, it is equally applicable for use wherever a large multiplication of power is required.

In Fig. 3 I have shown my preferred form of arrangement for pulling stumps, in which I place under the cable 3 a log 22 which will give the necessary pull and twist to uproot stumps.

I realize that considerable variation is possible in the details of construction and arrangement of parts without departing from the spirit of my invention, and I therefore do not intend to limit myself to the specific form shown and described.

I claim

In an apparatus of the character described, the combination with a running block, of a standing block, a cable reeved through said blocks, a third block connected to the running end of the cable adjacent to the running block, the cable extending from said standing block through said third block, a fourth block bent upon the cable between the second and third blocks, said cable extending from the third block and reeved through the fourth block, a fifth block bent upon the cable between the third and fourth blocks and the cable reeved through said fifth block.

In testimony whereof I affix my signature in presence of two witnesses.

STEPHEN MATHIAS SMITH.

Witnesses:
K. E. KLEIN,
FRANCIS M. PHELPS.